United States Patent
Ali et al.

(10) Patent No.: US 10,572,668 B2
(45) Date of Patent: Feb. 25, 2020

(54) OPERATIONAL VERIFICATION

(71) Applicant: HEWLETT-PACKARD DEVELOPMENT COMPANY, L.P., Houston, TX (US)

(72) Inventors: Valiuddin Y. Ali, Cypress, TX (US); Lan Wang, Cypress, TX (US); Boris Balacheff, Lyons (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/747,868

(22) PCT Filed: Jan. 27, 2016

(86) PCT No.: PCT/US2016/015230
§ 371 (c)(1),
(2) Date: Jan. 26, 2018

(87) PCT Pub. No.: WO2017/131680
PCT Pub. Date: Aug. 3, 2017

(65) Prior Publication Data
US 2018/0322291 A1    Nov. 8, 2018

(51) Int. Cl.
*G06F 21/57*     (2013.01)
*G06F 9/44*      (2018.01)
*G06F 9/4401*    (2018.01)
*G06F 21/44*     (2013.01)
*G06F 21/60*     (2013.01)

(52) U.S. Cl.
CPC .......... *G06F 21/572* (2013.01); *G06F 9/4401* (2013.01); *G06F 21/575* (2013.01); *G06F 21/44* (2013.01); *G06F 21/602* (2013.01)

(58) Field of Classification Search
CPC ..... G06F 21/572; G06F 9/4401; G06F 21/575
See application file for complete search history.

(56) References Cited

U.S. PATENT DOCUMENTS

| | | | |
|---|---|---|---|
| 5,844,986 A * | 12/1998 | Davis .................... | G06F 21/572 713/187 |
| 6,651,188 B2 * | 11/2003 | Harding .............. | G06F 11/1417 714/38.13 |
| 7,069,452 B1 | 6/2006 | Hind et al. | |
| 7,337,309 B2 | 2/2008 | Nguyen et al. | |

(Continued)

FOREIGN PATENT DOCUMENTS

| | | |
|---|---|---|
| KR | 10-2007-0010892 A | 1/2007 |
| KR | 10-2015-0016037 A | 2/2015 |
| WO | WO-2014175867 | 10/2014 |

OTHER PUBLICATIONS

Whitty B.; "How to Recover from a Bad Bios Update"; Jun. 21, 2006; https://www.technibble.com/how-to-recover-from-a-bad-bios-update/.

*Primary Examiner* — Stefan Stoynov
(74) *Attorney, Agent, or Firm* — HPI Patent Department

(57) ABSTRACT

Example implementations relate to operational verification. In an example, operational verification includes a processor, a shared non-volatile memory storing updated system, and an embedded controller (EC) to operationally verify the updated system instructions based on comparison of a length of time associated with a BIOS boot of the computing system using the updated system instructions to a boot time threshold.

13 Claims, 3 Drawing Sheets

(56) References Cited

U.S. PATENT DOCUMENTS

| | | |
|---|---|---|
| 7,502,946 B2 | 3/2009 | Perkins et al. |
| 7,877,809 B1 | 1/2011 | Sutton |
| 8,566,574 B2 | 10/2013 | Shriver |
| 2003/0126511 A1* | 7/2003 | Yang .................... G06F 9/4401 714/39 |
| 2006/0143600 A1 | 6/2006 | Cottrell et al. |
| 2010/0125752 A1* | 5/2010 | Chen ................... G06F 11/1666 714/6.1 |
| 2011/0161645 A1 | 6/2011 | Zhang |
| 2012/0124567 A1 | 5/2012 | Landry |
| 2012/0191963 A1 | 7/2012 | Chen |
| 2013/0080757 A1* | 3/2013 | Chou .................. G06F 11/1417 713/2 |
| 2014/0258699 A1* | 9/2014 | Hsu .................... G06F 11/1417 713/2 |

\* cited by examiner

OPERATIONAL VERIFICATION

BACKGROUND

A computing system can include instructions to perform various startup functions of the computing system. These instructions can include Basic Input/output System (BIOS) instructions such as legacy BIOS instructions or Unified Extensible Instructions Interface (UEFI) instructions. BIOS instructions can be the subject of attacks by malware in the computing system or from an external service. As a result of an attack, the BIOS instructions can become compromised.

DETAILED DESCRIPTION

Malware attacks on system instructions used to perform startup of a computing system can cause the integrity of the computing system to be compromised such that unauthorized access and operations in the computing system can occur. Compromised system instructions can refer to system instructions that have been corrupted such that the system instructions are not executable and/or have been changed in some way but are still executable. For example, compromised system instructions can allow undesired remote monitoring and/or control of the computing system by a malicious entity, unauthorized access and/or modification of data in the computing system by malware, disablement of the computing system, and so forth.

Consequently, it may be desirable to verify integrity of system instructions. Some approaches attempting to verify integrity of system instructions have been limited to attempting verification using cryptographic verification techniques. However, such approaches may not verify integrity of system instructions for a particular computing system. That is, components (e.g., operating systems, graphics cards, etc.) can vary from computing system. So, while update instructions may be cryptographically verified, once the update instructions are applied to a particular computing system the computing system may not function as intended. For example, a basic input/output (BIOS) system of the computing system may not boot and/or may not boot within a desired amount of time.

Accordingly, examples of the disclosure include methods, systems, and computer-readable and executable instructions suitable for operational verification. For example, operational verification can include a processor, a shared non-volatile memory storing updated system, and an embedded controller (EC) to operationally verify the updated system instructions based on comparison of a length of time associated with a BIOS boot of the computing system using the updated system instructions to a boot time threshold. Desirably, operational verification can ensure a particular computing system such as a BIOS functions as intended when updated.

Figure 1:
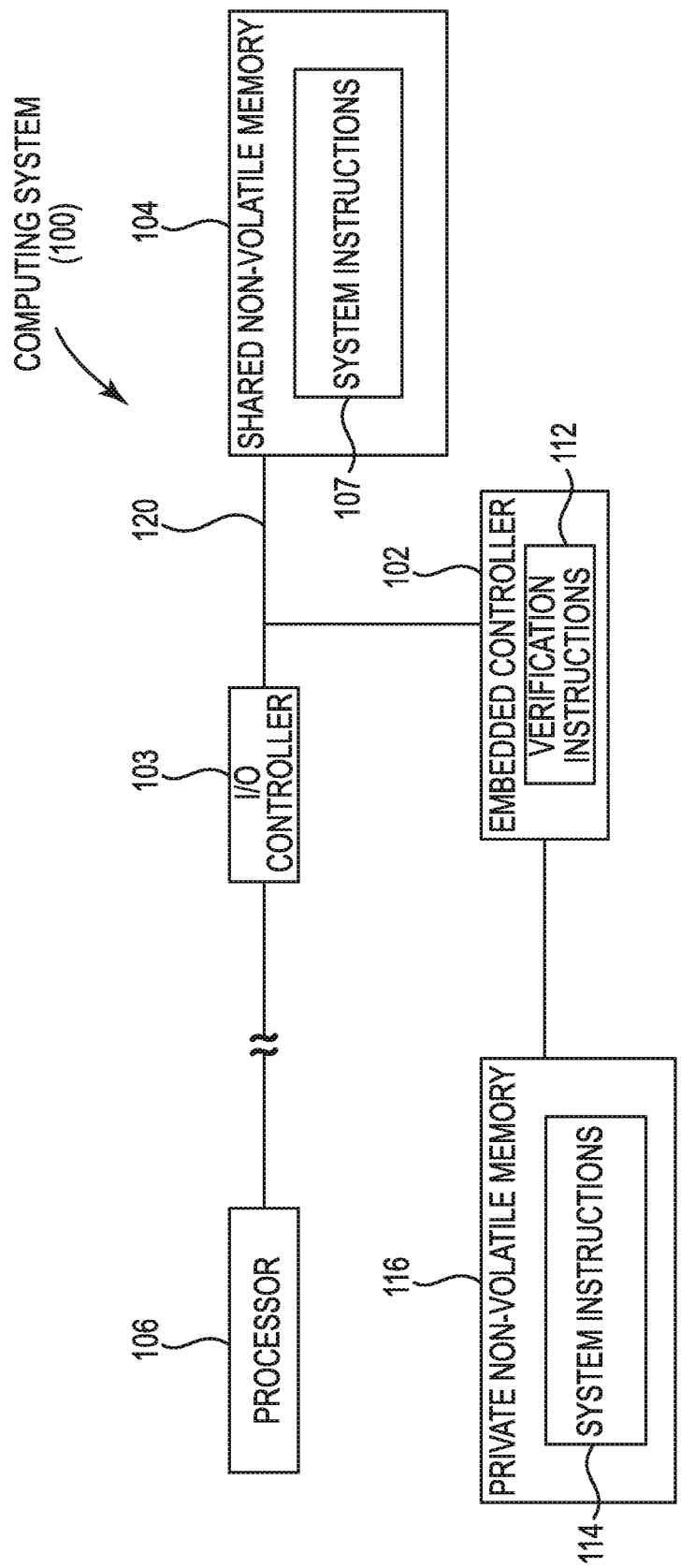
FIG. 1 illustrates a block diagram of an example of a computing system suitable for operational verification according to the disclosure.

FIG. 1 illustrates a block diagram of an example of a computing system 100 suitable for operational verification. The computing system 100 includes an EC 102, an input/output (I/O) controller 103, a shared non-volatile memory 104, a processor 106, and a private non-volatile memory 116.

The EC 102 can be physically separate from the processor 106 of the computing system 100 as illustrated or can be physically coupled to the processor in some examples. The EC can, in some examples, include and/or be formed from a super I/O (SIO). The processor 106 can execute the operating system (OS), application instructions, and other instructions in the system 100. The EC 102 can be used to perform specific predefined tasks, as programmed into EC instructions (not shown) included in the EC 102. Examples of tasks that can be performed by the EC 102 can include controlling a power supply that supplies power supply voltages to various components in the computing system 100, charging and control of a battery in the computing system 100, monitoring a temperature in the computing system 100, controlling a fan in the computing system 100, and/or interaction with a user input device (such as a keyboard, mouse, etc. of the computing system 100), among others. The EC 102 can be implemented with a microcontroller, an application-specific integrated circuit (ASIC), a programmable gate array (PGA), or any other type of programmable circuit.

The I/O controller 103 is physically separate from the processor 106 and the EC 102 of the computing system. As illustrated in FIG. 1, the I/O controller 103 can be provided between the processor 106 and the shared non-volatile memory 104 while also being between the EC 102 and the shared non-volatile memory 104. For instance, the I/O controller 103 can be connected between the processor 106 and a shared bus 120 while being connected between the EC 102 and the shared bus 120.

In some examples, the I/O controller 103 can be a Platform Controller Hub (PCH), among other types of I/O controllers suitable to promote operational verification, as described herein. The PCH can include various functions, including a display interface to a graphics subsystem, a system bus interface to a system bus to which various I/O devices can be connected, and so forth. The I/O controller 103 can, in various examples, facilitate communication between the processor 106 and the shared non-volatile memory 104. Similarly, the I/O controller 103 can permit communication between the EC 102 and the shared non-volatile memory 104.

The shared non-volatile memory 104 is "shared" in the sense that it is accessible by multiple entities, including the EC 102 and at least one other entity (including the processor 106). The private non-volatile memory 116 is accessible by the EC 102, but is inaccessible to the processor 106 or to other components in the computing system 100. Making the private non-volatile memory 116 inaccessible to the processor 106 and other components protects the content of the private non-volatile memory 116 from unauthorized tampering. The private non-volatile memory 116 is accessible by the EC 102 at all times.

The private non-volatile memory 116 can be physically separate from the shared non-volatile memory 104 (such as implemented in different physical memory devices). Alternatively, the private non-volatile memory 116 and the shared non-volatile memory 104 can physically reside on a common memory device, but the shared non-volatile memory 104 and the private non-volatile memory 116 are in different segments of the physical memory device, where the segment of the physical memory device that contains the private non-volatile memory 116 is accessible by the EC 102 and is not accessible by the processor 106.

The shared non-volatile memory 104 is accessible over a shared bus 120 by the EC 102 or by another entity. In various examples, the shared bus 120 can be a shared Serial Peripheral Interface (SPI) bus and/or an enhanced Serial Peripheral Interface (eSPI) bus. A SPI bus is a synchronous serial data link in which devices on the SPI bus operate in a master-slave mode. That is, with an SPI bus, just one master can have access to the shared bus 120 at any given time, such that just one master can access the shared non-volatile memory 104 at a time. In some examples, runtime access requests from the EC 102 and runtime access requests from the processor 106 can be transmitted by the I/O controller 103 via the shared bus 120 to the shared memory 104 (i.e., shared non-volatile memory).

The shared non-volatile memory 104 can store system instructions 107. System instructions 107 can be used to perform startup of a computing system. System instructions 107 can be in the form of machine-readable instructions executable on a processor (or processors) of the computing system. Examples of computing systems include desktop computers, notebook computers, tablet computers, personal digital assistants (PDAs), smartphones, game appliances, server computers, storage nodes, network communication nodes, among other examples.

System instructions can include BIOS and/or be formed of BIOS instructions, which can initialize various components of the computing system, and load an OS of the computing system. The BIOS instructions can perform checking of hardware components to ensure that the hardware components are present and functioning properly. This can be part of a power-on self-test (POST) procedure and/or a booting sequence. The BIOS instructions can load and pass control to the OS. BIOS instructions can include legacy BIOS instructions or Unified Extensible Instructions Interface (UEFI) instructions.

The BIOS instructions can include EC instructions (not shown) that are executable by the EC 102 and/or can include a boot block (not shown) that is to be executed by the processor 106. The EC instructions can be machine-readable instructions executable in the EC 102 or can be application software in the form of machine-readable instructions.

The boot block is a part of the BIOS instructions, and is executed when the computing system 100 starts up prior to the rest of the BIOS instructions being executed. The boot block can be used to check the integrity of the BIOS instructions, for example by cryptographic verification, as well as to perform other initial functions. If the boot block confirms the integrity of the BIOS instructions, the boot block can pass control to the main portion of the BIOS instructions for initiating the remaining operations associated with the BIOS instructions.

The computing system 100 also includes the private non-volatile memory 116, which stores system instructions 114. The system instructions 114 can be a copy of system instructions 107. The system instructions can include a boot block 132 and/or EC instructions 130, among other information.

The system instructions copy 114 in the private non-volatile memory 116 can be a duplicate of the system instructions 107 in the shared non-volatile memory 104. Alternatively, the system instructions 114 can be a different version (later version or earlier version) than the system instructions 107. For example, the system instructions 114 can include an earlier version (e.g., version 1.0) of BIOS instructions as compared to a version (e.g., version 1.1) of BIOS instructions stored in the shared non-volatile memory, as described herein.

The EC 102 can attempt to use the system instructions in the shared non-volatile memory 104 during a restart of the computing system 100. If the EC 102 is unable to successfully use the system instructions in the shared non-volatile memory 104, then the EC 102 can attempt to use the system instructions in the private non-volatile memory 116 in an effort to start the computing system 100. If the EC 102 is unable to start the system using either of the system instructions in the private non-volatile memory or the system instructions in the shared non-volatile memory, then an error has occurred. In another example, the EC can start the system but the system firmware may not be able to complete the boot process.

Such an error may be due to a compromise of both the system instructions in the private non-volatile memory and the system instructions in the shared non-volatile memory. However, as mentioned, even those update instructions that are cryptographically verified, once applied to the computing system may cause the computing system to function other than as intended. Thus it is possible that even when both the system instructions in the private non-volatile memory and the system instructions in the shared non-volatile memory are not compromised, the system still fails the boot process. For example, a BIOS system of the computing system may not boot and/or may not boot within a desired amount of time.

The EC 102 includes verification instructions 112 to verify updated system instructions such as those stored in the shared non-volatile memory. In various examples, the EC 102 can operationally verify updated system instructions (those stored in the shared non-volatile memory 104) based on comparison of a length of time associated with a BIOS boot of the computing system 100 using the updated system instructions to a boot time threshold, as described herein in greater detail with respect to FIGS. 2 and 3. In various examples, updated system instructions can include and/or be formed of updated BIOS instructions.

A length of time associated with a BIOS boot of the computing system refers to an amount of elapsed time from a time of initiation of the BIOS boot to a time when the BIOS has finished the system initialization and/or is ready to transfer control to a next component in a boot process. For example, initiation of the BIOS boot can refer to a first action in a BIOS boot sequence. As used herein, the BIOS is fully initialized when the BIOS is ready to pass and/or passes control over to a next component in the boot process such as an OS and/or a hypervisor. For instance, the BIOS can be identified as fully initialized when it is ready to call, perform, or otherwise cause a "ready to boot" sequence to execute. In some examples, the BIOS can pass control to an OS of the computing device, among other possibilities.

A boot time threshold refers to a predetermined amount of time (e.g., 10 seconds). The predetermined amount of time can be specified by a user of the computing device 100, a system administration, and/or a service level agreement, among other possibilities.

The EC 102 can include cryptographic hardware (not shown) that can perform cryptographic computations, such as those used in the verifying of the EC instructions, updated system instructions, and/or the boot block. The cryptographic hardware can be in the form of circuitry that is to perform cryptographic computations.

The verification instructions 112 can cryptographically verify EC instructions, system instructions, BIOS updates, and/or data. As used herein cryptographically verifying can include validating that the piece of instructions has not been changed and/or confirming that the piece of instructions is from a trusted source. For example, the verification can be a Rivest, Shamar, and Adleman (RSA) verification technique that employs cryptographic encryption, among other possibly cryptographic techniques.

The verification instructions 112 can be stored on a non-transitory memory resource such as RAM and/or ROM as non-transitory MRM including machine readable instructions (MRI), among other possibilities. Memory resource can be integrated in a single device or distributed across multiple devices. Further, memory resource can be fully or partially integrated in the same device as the EC 102, and/or the processing resource 106 or it can be separate but accessible to the EC 102 and/or the processor 106.

The memory resource can include a number of modules (not shown) such as receive, initiate, and verify modules. The number of modules can include MRI (e.g., verification instructions) that when executed by the EC 102 can perform a number of functions including those described herein.

The receive module can include instructions that when executed by the EC 102 receive updated BIOS instructions at a shared non-volatile memory of a computing system. The initiate module can initiate a BIOS boot of the computing system using the updated BIOS instructions. The verify module can operationally verify the updated BIOS instructions when an amount of time associated with the BIOS boot of the computing system using the updated BIOS instructions is less than a boot time threshold.

The EC 102 can include a ROM which can be used to store a boot loader and/or an encryption key. The encryption key can be the key (public key or private key) used to perform cryptographic verification of the EC instructions and/or system instructions such as updated BIOS instructions, among other possibilities. The EC 102 can be coupled to a user input device such as a mouse device or other type of input device, a keyboard, a fan, a battery and/or a power supply to manage the respective devices (under control of the EC instructions for example).

In the shared non-volatile memory a signature can associated with the system instructions 107. Similarly, in the private non-volatile memory a signature can be associated with the system instructions 114. Such a signature can be used in the cryptographic verification of the respective system instructions. Use of a signature in the verification process can allow a determination of the authenticity of the respective system instructions and/or determine that they have not been compromised. Determining system instructions as compromised can include cryptographically detecting that a piece (e.g., a key, etc.) of the system instructions has been changed. Similarly, it can be determined whether that the piece of system instructions is from a trusted source, among other possibilities.

Cryptographic verification of the system instructions can be accomplished by decrypting the respective signature using an encryption key such as an encryption key stored in the ROM of the computing device, among other suitable cryptographic technique can be used to perform the verification. Decrypting a signature produces a respective value (e.g., a hash value) that can be compared with a corresponding calculated value (e.g., a hash value) of the system instructions. If the foregoing values match, then the system instructions are verified.

Figure 2:
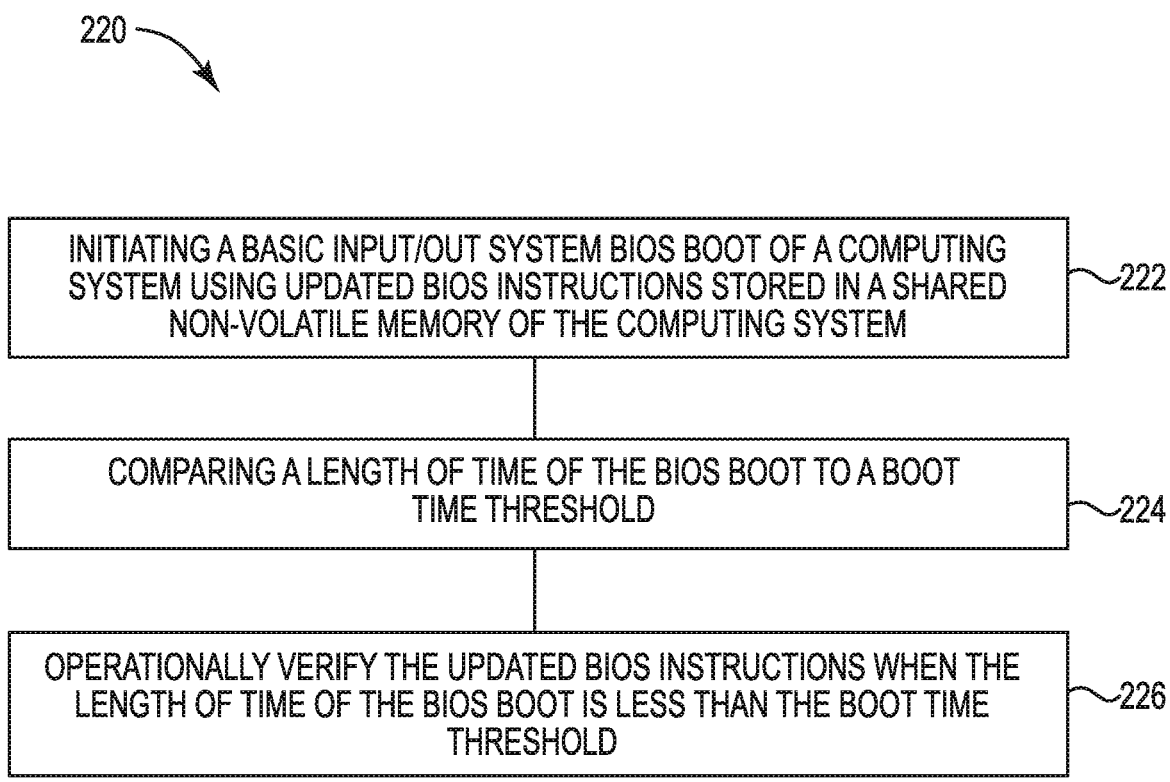
FIG. 2 illustrates a flow diagram of an example of a method suitable for operational verification according to the disclosure.

FIG. 2 illustrates a flow diagram of an example of a method 220 suitable for operational verification according to the disclosure. An EC can execute instructions such as verification instructions to perform some or all of the method 220.

As shown at 222, the method 220 can include initiating a BIOS boot of a computing system using updated BIOS instructions stored in a shared non-volatile memory of the computing system, as described herein. As shown at 224, the method can include comparing a length of time of the BIOS boot to a boot time threshold. The length of time of the BIOS boot can be equal to an elapsed amount of a timer beginning from a time of initiation of the BIOS boot and ending at a time when the BIOS is ready to transfer control to the next component (e.g., an OS and/or a hypervisor) in a the boot process or when the boot threshold is satisfied. In various examples, the method 220 can include operationally verifying the updated BIOS instructions when the length of time of the BIOS boot (e.g., 4 seconds) is less than the boot time threshold (e.g., 5 seconds), as described herein.

Figure 3:
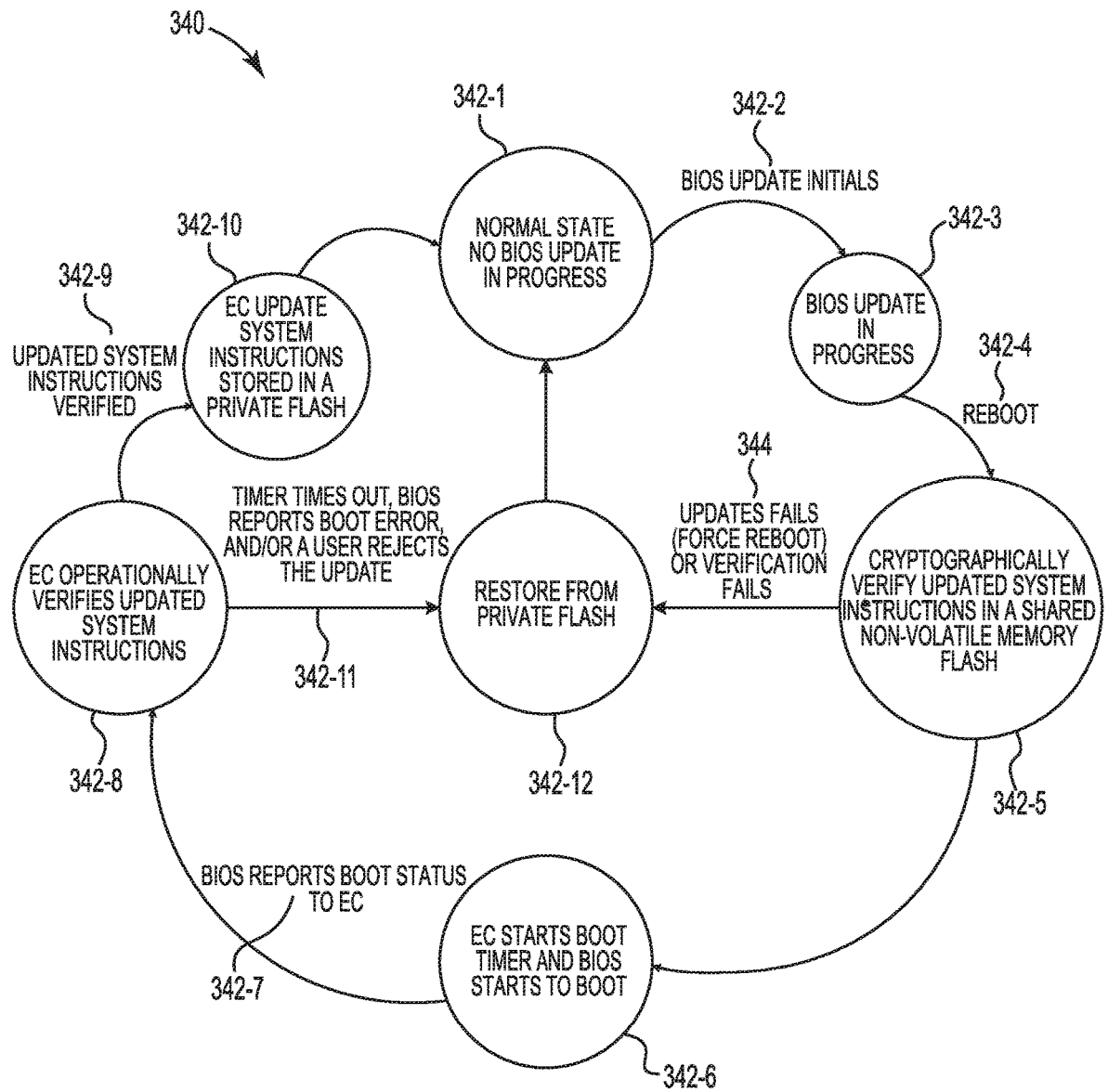
FIG. 3 illustrates a flow diagram of an example of a method suitable for operational verification according to the disclosure.

In some examples, the method 220 can include updating BIOS instructions stored in a private flash of the computing system with the updated BIOS instructions in response to operationally verifying the updated BIOS instructions as is described in greater detail with respect to FIG. 3.

The method can include providing a notification when the updated BIOS instructions are operationally verified. In this manner, a user of the computing device and/or a system administrate can determine whether to proceed to 342-10 and have the EC update system instructions stored in the private flash. However, in some examples, the EC can automatically (e.g., without a user input) update system instructions stored in the private flash in response to deeming the updated system instructions verified at 342-9.

FIG. 3 illustrates a flow diagram of an example of a method 340 suitable for operational verification according to the disclosure. At 342-1 the method 340 can operate a computing device in a normal state. During this normal operation of the computing device no BIOS update is in progress. At 342-2, a BIOS update can be initiated by a user of the computing device, a system administrator, or otherwise. At 342-3 the BIOS update can be in progress. While in progress, a BIOS update can store updated system instructions such as updated BIOS instructions in a shared non-volatile memory of the computing device. That is, in various examples, the computing device can receive updated system instructions such as updated BIOS instructions at a shared non-volatile memory of a computing system.

At 342-4, the computing system can reboot. Such a reboot can occur in response to storage of updated system instructions such as updated BIOS instructions being stored (e.g., fully downloaded) to the private non-volatile memory and/or can occur in response to a user input to the computing device, among other possibilities. At 342-5 the method can cryptographically verify, as described herein, the updated system instructions such as updated BIOS instructions stored in the shared non-volatile memory.

The method 340 can proceed to 342-6 and start an EC boot timer and start a BIOS boot of the computing system using the updated system instructions (e.g., updated BIOS instructions). Put another way, the EC can initiate a BIOS boot of the computing system using the updated BIOS instructions. The EC boot timer can measure a length of time of the BIOS boot. At 342-7 the BIOS can report a boot status to the EC. The BIOS can report this status near continuously during a BIOS boot, periodically during a BIOS boot, and/or when the BIOS is fully booted (e.g., ready to call an operating system of the computing device).

The method can proceed to 342-12 when an update fails (e.g., a forced reboot) and/or a cryptographic verification fails as shown at 344. In such examples, the method can restore system instructions such as BIOS instructions from private non-volatile memory to the shared non-volatile memory to effective 'roll-back' the system instructions in the shared non-volatile memory to a pre-updated system instructions status. That is, it is noted that in some examples, BIOS instructions stored in the private non-volatile memory can be a different version of BIOS instructions (e.g., version 1.0) than the updated BIOS instructions stored in the shared non-volatile memory (e.g., version 1.1, 1.2, etc.). In some examples, the EC is to restore system instructions stored in a shared non-volatile memory when the updated system instructions are not operationally verified, as described herein.

In some examples, updates to system instructions stored in shared memory may be propagated to the private memory. It is noted that such propagation does not occur immediately/coincide with an initial updated of system instructions at the shared memory but instead follows cryptographic and operations verification, as described herein.

However the disclosure is not so limited. Rather, in some examples, system instructions in private memory can be 'frozen' and not updated when and/or following update(s) to system instructions in shared memory. For instance, original system instructions such as BIOS instructions (e.g., version 1.0) can be maintained in the private memory regardless of update(s) to system instructions in the shared memory, in some examples.

In response to restoring the system instructions from the private memory the method can proceed back to 342-1 and operate in a normal state.

At 342-8 the EC can operationally verify updated system instruction such as updated BIOS instructions. For instance, the EC can operationally verify the updated BIOS instructions when an amount of time associated with the BIOS boot of the computing system using the updated BIOS instructions is less than a boot time threshold. Following operational verification at 342-9 and cryptographic verification at 342-5 the updated system instructions (e.g., update BIOS instructions) can be deemed verified as shown at 342-9. In various examples, the EC can update system instructions stored in the private flash of the computing device as shown at 342-10 and proceed to a normal state 342-1.

In contrast, the EC can invalid (i.e., verification fails) updated system instructions when an amount of time associated with the BIOS boot of the computing system using the updated BIOS instructions satisfies a boot time threshold. As used herein, the amount of time satisfies the boot time threshold when it is equal to or greater than the boot time threshold. When a timer times out (i.e., the boot time threshold is satisfied), the BIOS reports an error, and/or a user rejects the updated system instructions as shown at 342-11 the method can proceed to 342-12 and restore system instructions from the private non-volatile memory (i.e. private flash) along with proceeding to a normal state at 342-1. In some examples, the EC can initiate a BIOS boot of the computing system using the restored BIOS instructions to ensure the BIOS boots and/or the computing device functions as intended.

The figures herein follow a numbering convention in which the first digit or digits correspond to the drawing figure number and the remaining digits identify an element or component in the drawing. Similar elements or components between different figures may be identified by the use of similar digits. For example, 100 may reference element "100" in FIG. 1, and a similar element may be referenced as "200" in FIG. 2.

Many examples can be made without departing from the spirit and scope of the system and method of the disclosure, this specification sets forth some of the many possible example arrangement and implementations. Elements shown in the various examples herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

As used herein, "a number of" an element and/or feature can refer to one or more of such elements and/or features. In addition, "for example" and similar phrasing is intended to mean, "by way of example and not by way of limitation". It is understood that when an element is referred to as being "on," "connected to", "coupled to", or "coupled with" another element, it can be directly on, connected, or coupled with the other element or intervening elements may be present.

What is claimed:

1. A computing system, comprising:
   a processor;
   a shared non-volatile memory storing updated system instructions;
   a private non-volatile memory storing a copy of the system instructions; and
   an embedded controller (EC) to operationally verify the updated system instructions based on comparison of a length of time associated with a firmware boot of the computing system using the updated system instructions to a boot time threshold, wherein the private non-volatile memory that is accessible by the EC and inaccessible by the processor.

2. The system of claim 1, wherein the updated system instructions comprise updated Unified Extensible Instructions Interface (UEFI) instructions.

3. The system of claim 2, wherein the EC is to update the copy of the UEFI instructions stored in the private non-volatile memory of the computing device in response operationally verifying the updated UEFI instructions.

4. The system of claim 3, wherein the copy of the UEFI instructions stored in the private non-volatile memory to be updated by the EC is a different version of UEFI instructions than the updated UEFI instructions stored in the shared non-volatile memory.

5. The system of claim 1, wherein the length of time associated with the firmware boot is begins upon initiation of the firmware boot.

6. The system of claim 5, wherein the length of time associated with the firmware boot ends when the firmware transfers control to a next component.

7. The system of claim 1, wherein the EC is to cryptographically verify the updated system instructions.

8. The system of claim 1, wherein the EC is to operationally verify the updated system instructions when the amount of time associated with a boot of the system using the updated system instructions is less than the boot time threshold.

9. The system of claim 1, wherein the EC is to restore system instructions stored in the shared non-volatile memory when the updated system instructions are not operationally verified.

10. A non-transitory machine-readable medium including instructions executable to:

receive updated Unified Extensible Instructions Interface (UEFI) instructions at a shared non-volatile memory of a computing system;

initiate a firmware boot of the computing system using the updated UEFI instructions;

operationally verify the updated UEFI instructions when an amount of time associated with the firmware boot of the computing system using the updated UEFI instructions is less than a boot time threshold; and restore the shared non-volatile memory to UEFI instructions stored in a private non-volatile memory of the computing system when the amount of time associated with the firmware boot is equal to or greater than the boot threshold, wherein the private non-volatile memory is accessible to an embedded controller of the computing system and inaccessible by a processor of the computing system.

11. The medium of claim 10, further comprising instructions to initiate the firmware boot of the computing system using the restored BIOS instructions.

12. A method, comprising:

initiating a firmware boot of a computing system using updated Unified Extensible Instructions Interface (UEFI) instructions stored in a shared non-volatile memory of the computing system;

comparing a length of time of the firmware boot to a boot time threshold;

operationally verify the updated UEFI instructions when the length of time of the firmware boot is less than the boot time threshold; and updating UEFI instructions stored in a private flash of the computing system with the updated UEFI instructions in response to operationally verifying the undated UEFI instructions, wherein the private flash is accessible by an embedded controller of the computing system and inaccessible by a processor of the computing system.

13. The method of claim 12, including providing a notification when the updated UEFI instructions are operationally verified.

* * * * *